(12) United States Patent
Toivola et al.

(10) Patent No.: US 8,928,189 B2
(45) Date of Patent: Jan. 6, 2015

(54) POWER CONNECTOR BETWEEN SERIAL INTERFACES

(75) Inventors: Timo Tapani Toivola, Turku (FI); Pertti Vihtori Saarinen, Salo (FI)

(73) Assignee: Nokia Corporation, Espoo (FI)

( * ) Notice: Subject to any disclaimer, the term of this patent is extended or adjusted under 35 U.S.C. 154(b) by 849 days.

(21) Appl. No.: 12/743,152

(22) PCT Filed: Nov. 15, 2007

(86) PCT No.: PCT/EP2007/062382
§ 371 (c)(1),
(2), (4) Date: May 14, 2010

(87) PCT Pub. No.: WO2009/062551
PCT Pub. Date: May 22, 2009

(65) Prior Publication Data
US 2010/0244587 A1    Sep. 30, 2010

(51) Int. Cl.
*H01H 47/00* (2006.01)
*G06F 13/40* (2006.01)

(52) U.S. Cl.
CPC .................................. *G06F 13/4081* (2013.01)
USPC ........................................................ 307/130

(58) Field of Classification Search
CPC ............................................. G06F 2213/0042
USPC .................................. 307/130; 710/100, 300
See application file for complete search history.

(56) References Cited

U.S. PATENT DOCUMENTS

| 6,000,042 A | 12/1999 | Henrie | |
| 7,310,697 B2* | 12/2007 | Pandit et al. | 710/313 |
| 7,627,845 B2* | 12/2009 | Komatsu et al. | 716/100 |
| 8,073,499 B2* | 12/2011 | Ruff et al. | 455/573 |
| 2003/0030412 A1 | 2/2003 | Matsuda et al. | |
| 2003/0095368 A1* | 5/2003 | Daniels et al. | 361/93.9 |
| 2004/0042138 A1 | 3/2004 | Saito et al. | |
| 2004/0421838 | 3/2004 | Saito et al. | |
| 2005/0039060 A1 | 2/2005 | Okayasu | |
| 2005/0138446 A1* | 6/2005 | Matsuda | 713/300 |
| 2007/0067547 A1 | 3/2007 | Jang | |
| 2008/0140887 A1* | 6/2008 | Gallant et al. | 710/100 |
| 2010/0169534 A1* | 7/2010 | Saarinen et al. | 710/316 |

FOREIGN PATENT DOCUMENTS

WO    WO 2008068552 A1 *   6/2008

OTHER PUBLICATIONS

Office Action received in corresponding Chinese Application No. 200780101566.1, dated Aug. 24, 2011, 12 pages.
USB Implementers Forum, Inc., "Deprecation of the Mini-A and Mini-AB Connectors", May 23, 2007.
International Search Report and Written Opinion of the International Searching Authority received from PCT Application No. PCT/EP2007/062382, dated Jul. 11, 2008, 12 pages.
Koeman, "USB on the Go", Cypress Semiconductor, May 9, 2001.

(Continued)

*Primary Examiner* — Daniel Cavallari
(74) *Attorney, Agent, or Firm* — Harrington & Smith

(57) ABSTRACT

This invention relates to a method, an apparatus, a computer program product and a system for a first serial and a second serial interface for connecting or disconnecting a power terminal of a first serial interface to a power terminal of a second serial interface based on a voltage level at an identification terminal of the second serial interface, wherein each interface comprising at least one data line and power supply line.

15 Claims, 7 Drawing Sheets

(56) References Cited

OTHER PUBLICATIONS

On-The-Go Supplement to the USB 2.0 Specification, Revision 1.3 Dec. 5, 2006.
Office Action received from European Patent Applicaiton No. 07822624.8, dated Oct. 4, 2010, 4 pages.
Intel et al., "Universal Serial Bus Specification—Revision 2.0", Universal Serial Bus Specification, Apr. 27, 2000.
Office Action dated dated Mar. 14, 2012, Chinese Application No. 200780101566.1, 5 pages.

* cited by examiner

US 8,928,189 B2

POWER CONNECTOR BETWEEN SERIAL INTERFACES

RELATED APPLICATION

This application was originally filed as PCT Application No. PCT/EP2007/062382 filed Nov. 15, 2007.

FIELD

This invention relates to a method, an apparatus, a computer program product and a system for a first serial and a second serial interface.

BACKGROUND

The Universal Serial Bus (USB) is a technology which typically provides a fast, cabled data connection between a complex device (e.g. a PC etc.) which is called the Host and a connected peripheral (e.g. a mouse, keyboard etc.) which is called the Device.

The USB standard has been extended to include connections between mobile devices in the USB On-The-Go (OTG) supplement (On-The-Go Supplement to the USB 2.0 Specification Revision 1.3 Dec. 5, 2006). USB OTG allows a peripheral at an end of the USB connection to take a Host or Device role.

Devices that support USB OTG will have a new connector type. For instance, there exist Micro-A plugs, Micro-B plugs and Micro-AB receptacle defined for USB OTG devices. A USB OTG device to where a Micro-A plug is inserted will initially take the host role and will supply power via its Vbus terminal for the duration of the connection. A USB OTG device to where a Micro-B plug is inserted will initially take a device role and it will receive power via the Vbus terminal.

Due to the new connector type it is not possible to use USB OTG devices like a headset or FM receiver accessories that has a hard-wired cable with Micro-A plug with a device that has a Standard-A receptacle and is not supporting USB OTG, since USB standard-A always represents a host socket and supplies Vbus power.

SUMMARY

According to a first aspect of the present invention, an apparatus is described, the apparatus comprising a first and a second serial interface, said first serial interface, each comprising at least one data line and at least one power supply line, the apparatus further comprising a switching unit configured to connect or disconnect a power terminal of the first serial interface to a power terminal of the second serial interface based on a voltage level at an identification terminal of the second serial interface.

According to a second aspect of the present invention, a method is described, the method comprising connecting or disconnecting a power terminal of a first serial interface to a power terminal of a second serial interface based on a voltage level at an identification terminal of the second serial interface, wherein each serial interface comprising at least one data line and at least one power supply line.

According to a third aspect of the present invention, a computer program product in which a computer program code is stored in a computer readable medium, which computer program code realizes the connecting or disconnecting a power terminal of a first serial interface to a power terminal of a second serial interface based on a voltage level at an identification terminal of the second serial interface, wherein each serial interface comprising at least one data line and at least one power supply line.

According to a fourth aspect of the present invention, a system is described, comprising a first apparatus as mentioned above, a second apparatus comprising a serial interface configured to be connected to the first serial interface; and a third apparatus comprising a serial interface configured to be connected to the second serial interface.

According to a fifth aspect of the present invention, an apparatus is described, the apparatus comprising a first and a second serial interface means, the apparatus further comprising switching means for connecting or disconnecting a power terminal of the first serial interface means to a power terminal of the second serial interface means based on a voltage level at an identification terminal of the second serial interface means.

For instance, said first serial interface may represent a USB standard-A plug so that the apparatus may be configured to be connected to any device that comprises a USB standard-A receptacle. The second serial interface may also represent a USB interface but it also may represent any other serial interface. For instance, in case it represents a USB interface, it may for instance represent a USB micro interface, e.g. a USB Micro-AB receptacle.

The switching unit may be connected to the power terminal of the first serial interface and to the power terminal of the second serial interface in order to connect or disconnect these power terminals based on a voltage level at a terminal of the second serial interface. This terminal associated with said voltage level may represent any well-suited terminal of said second serial interface which represents an identification terminal, wherein this well-suited terminal may depend on the type of the second serial interface. The voltage level at said well-suited terminal should be capable to be used as a representative of a characteristic of a device connected to the second serial interface, so that based on this detected voltage level (and thus on the detected device characteristic of a connected device) the power terminal of the second serial interface is connected or disconnected with the power terminal of the first serial interface.

For instance, said characteristic may be associated with a special voltage level which may indicate that a device which is connected to the second serial interface needs power supply from the power terminal of the second serial interface. Thus, if this special voltage level is determined at the terminal of the second serial interface then the power terminal of the first serial interface is connected to the power terminal of the second serial interface. Accordingly, when the apparatus is connected to another device via the first serial interface simultaneously, then the device connected to the second serial interface can be provided with power via the connected power terminals of the first serial interface and the second serial interface.

Furthermore, for instance, if the voltage level at the identification terminal of said second serial interface differs from said special voltage level, which may indicate that a device plugged to the second serial interface needs no power supply, then the power terminal of the first serial interface is disconnected from the power terminal of the second serial interface. For instance, said voltage level at the terminal being different from said special voltage level may indicate a connected device which is configured to supply power via the power terminal of its serial interface, like a host or a charger. Accordingly, a violation caused by power simultaneously supplied via the power terminal of the first serial interface and power supplied via the power terminal of the second serial interface can be omitted by some embodiments of the present invention.

Thus, any kind of devices can be plugged to the second serial interface, i.e. devices that need to be supported with power from the power terminal of the second serial interface as well as devices that must not be supported with power from that power terminal of the second serial interface. Thus, the apparatus according to the present invention can be used as an adaptor configured to connect a device having an interface being compatible with the second serial interface to another apparatus being compatible with the first serial interface.

According to an exemplary embodiment of the present invention, the first serial interface is a USB standard-A interface and represents a USB standard-A plug.

Thus, the apparatus can be connected to any device comprising a USB standard-A-receptacle like a PC, a notebook, a hub, a dedicated USB charger or any other device. This device may then provide power via the power terminals of the USB standard-A plug of the apparatus and the second serial interface to another device being connected to the second serial interface when the switching unit connects these power terminals.

According to an exemplary embodiment of the present invention, said second serial interface represents a USB interface.

Thus, a USB apparatus may be connected to the second serial interface. For instance, said USB apparatus may be a USB On-The-Go (OTG) apparatus. Furthermore, said USB interface may represent a USB micro connector.

For instance, said second serial interface may be configured to be USB OTG compatible, and the voltage level of the ID terminal of the second serial interface is used to decide whether the power terminals of the first serial interface and the second serial interface are to be connected or disconnected.

A USB OTG device to where a Micro-A plug is inserted will initially take the host role and will supply power via its Vbus terminal for the duration of the connection. For instance, said USB OTG device may represent a USB host or USB charger. The ID terminal of the Micro-B plug is floating, i.e. it is not connected or has a high impedance. Thus, when such a USB OTG device with a Micro-B plug is plugged to the second serial interface then the voltage level at the ID terminal of the second serial interface is not zero which indicates that a host or charger is plugged to the second serial interface. In this case the switching unit disconnects the power terminals of the first serial interface and the second serial interface. Accordingly, a power violation between the plugged USB OTG apparatus with Micro-B plug and another USB host or charger connected to the first serial interface can be avoided.

Thus, one embodiment of the present invention allows the connection of any USB OTG accessory with a Micro-A plug to a USB device comprising a USB standard-A receptacle. For instance, a USB OTG headset or FM receiver accessories that has a hard-wired cable with Micro-A plug can be used with a device that has a standard-A receptacle and is not supporting USB OTG.

Furthermore, when a USB OTG apparatus comprising a USB Micro-A plug is connected to this second USB interface, then the ID terminal of the USB OTG apparatus is short-circuited or has low impedance to GND in order to indicate an OTG device (i.e. no host or charger). In this case, a very low or zero voltage level can be detected at the ID terminal of the second serial interface, and the power terminal of the first serial interface is connected to the power terminal second serial interface. Thus, this USB OTG apparatus connected to the second serial interface can be provided with power from the first power terminal by means of the connection between the power terminals. Accordingly, an OTG device which needs to be supplied with power can be detected by means of the voltage at the ID terminal of the second serial interface.

According to an exemplary embodiment of the present invention, said second serial interface represents a USB Micro-AB receptacle.

Thus, in case the second serial interface represents a USB Micro-AB receptacle, any USB OTG device having a USB Micro-A plug or USB Micro-B plug can be plugged to another device having a USB standard-A receptacle without the risk of power violation.

According to an exemplary embodiment of the present invention, the power terminal of the first USB interface is connected to the power terminal of the second USB interface when the voltage level at said terminal of the second serial interface is below or equal to a predetermined voltage threshold.

Thus, a voltage level at the terminal of the second serial interface below or equal to this predetermined voltage threshold may be used as an indicator for a device which needs to be supplied with power via the power terminal of the second serial interface.

This predetermined voltage threshold may depend on the type of the second serial interface.

For instance, in case said second serial interface represents an interface configured to be connected with USB OTG devices, then the predetermined voltage threshold may be zero or a very low voltage level so that a short-circuited ID terminal caused by a USB Micro-A plug of a connected USB OTG device can be detected.

According to an exemplary embodiment of the present invention, said predetermined voltage threshold represents a very low or zero voltage level.

According to an exemplary embodiment of the present invention, the power terminal of the first USB interface is disconnected from the power terminal of the second USB interface when the voltage level at said terminal of the second serial interface is above a predetermined voltage threshold.

Thus, a voltage level at the terminal of the second serial interface above this predetermined voltage threshold may be used as an indicator for a device which must not be supplied with power via the power terminal of the second serial interface.

For instance, in case said second serial interface represents an interface configured to be connected with USB OTG devices, then the predetermined voltage threshold may be higher than zero or higher than a very low voltage level so that a floating ID terminal caused by a USB Micro-B plug of a plugged USB OTG device can be detected.

According to an exemplary embodiment of the present invention, said disconnecting and connecting is performed by a switching unit which comprises at least one transistor configured to connect or disconnect the power terminal of the first USB interface to the power terminal of the second serial interface.

For instance, said at least one transistor may represent at least one FET transistor.

According to an exemplary embodiment of the present invention, said switching unit comprises an overcurrent protection element configured to protect at least one transistor of said at least one transistor.

For instance, said overcurrent protection element may comprise a diode and a resistor, or, for instance, said overcurrent protection may represent a fuse or similar protecting device.

These and other aspects of the invention will be apparent from and elucidated with reference to the embodiments described hereinafter.

DETAILED DESCRIPTION

In the following detailed description, exemplary embodiments of the present invention will be described in the context of serial interfaces.

Figure 1A:
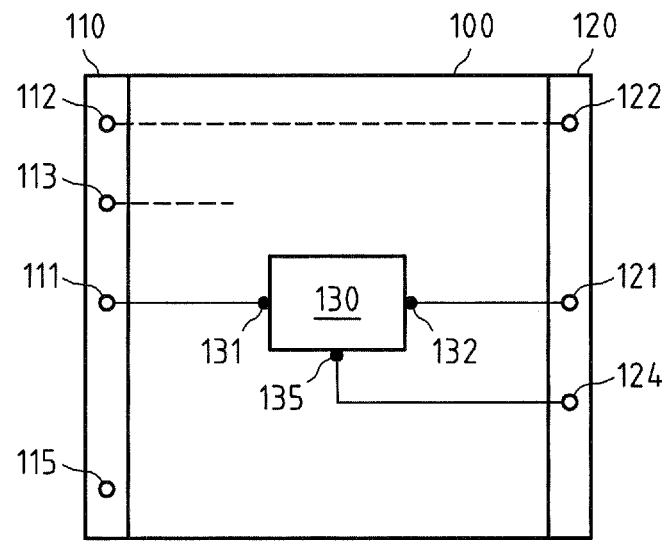
FIG. 1a: an illustration of a first exemplary embodiment of an apparatus according to the present invention.

FIG. 1a depicts a first exemplary embodiment of an apparatus 100 according to the present invention. This apparatus 100 will be explained in combination with the flowchart of an exemplary embodiment of a method according to the present invention depicted in FIG. 2.

This apparatus 100 comprises a first serial interface 110 and a second serial interface 120, wherein said first serial interface 110 represents a USB standard-A interface. According to the Universal Serial Bus Specification (Revision 2.0, Apr. 27, 2000), this USB standard-A interface comprises a power terminal 111, a D+ terminal 112, a D− terminal 113 and a ground terminal 115.

For instance, said first serial interface 110 may represent a USB standard-A plug so that the apparatus 100 may be connected to any device that has a standard-A receptacle. The second serial interface 120 may also represent a USB interface. For instance, it may represent a USB mini interface or a USB micro interface.

The apparatus 100 further comprises a switching unit 130. This switching unit 130 is connected via contact 131 to the power terminal 111 of the USB standard-A interface 110 and it is connected via contact 132 to the power terminal 121 of the second serial interface 120. The switching unit 130 is configured to connect or disconnect the power terminal 111 of the USB standard-A interface 110 to the power terminal 121 of the second serial interface 120 based on a voltage level at a terminal of the second serial interface 120. Therefore, the switching unit 130 is connected to a well-suited terminal 124 of the second serial interface 120 by connector 135. This well-suited terminal may depend on the type of the second serial interface 120.

For instance and not depicted in FIG. 1a, the connector 135 may be connected to the power terminal 121 of the second interface 120 in order to detect a voltage level and to decide to perform said connecting/disconnecting based on this detected voltage level, i.e. the terminal 124 and the power terminal 121 may represent the same terminal, but any other well-suited terminal of the second serial interface 120 may be used. The second serial interface 120 represents only an exemplary illustration of the second serial interface 120 and it has to be understood that the second serial interface 120 may comprise more than the terminals 121, 122 and 124 depicted in FIG. 1a. For instance, said second serial interface 120 may be configured to be USB OTG compatible, and in this case the terminal 124 may represent the identification (ID) terminal of the second serial interface.

The voltage level at said well-suited terminal 124 should be capable to be used as a representative of a characteristic of a device plugged to the second serial interface 120, so that based on this detected voltage level (and thus on the detected device characteristic of a plugged device) the power terminal 121 of the second serial interface can be connected or disconnected with the power terminal 111 of the first serial interface 110.

For instance, said characteristic may be associated with a special voltage level which may indicate that a device which is connected to the second serial interface 120 needs power supply from the power terminal of the second serial interface.

Thus, if this special voltage level is determined at the terminal 124 of the second serial interface 120 then the power terminal 111 of the first serial interface is connected to the power terminal 121 of the second serial interface 120. Accordingly, when the apparatus 100 is connected to another device via the USB standard-A interface 110 simultaneously, then the device connected to the second serial interface 120 can be provided with power via the connected power terminals of the USB standard-A interface and the second serial interface.

Furthermore, for instance, if the voltage level at the terminal 124 of said second serial interface 120 differs from said special voltage level, which may indicate that a device plugged to the second serial interface 120 needs no power supply, then the power terminal ill of the USB standard-A interface 110 is disconnected from the power terminal 121 of the second serial interface 120. For instance, said voltage level at the terminal being different from said special voltage level may indicate a plugged device which is configured to supply power via the power terminal of its serial interface, like a host or a charger.

Figure 2:
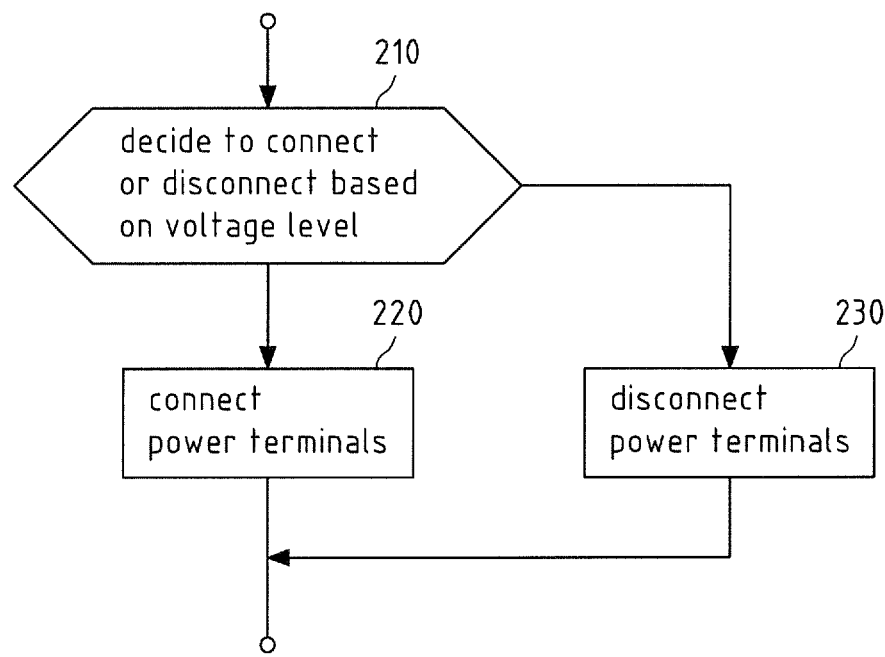
FIG. 2: a flowchart of an exemplary embodiment of a method according to the present invention.

In step 210 of the exemplary method depicted in FIG. 2. it is decided whether the switching unit connects or disconnects the power terminal 111 of the first serial interface 110 to the power terminal 121 of the second serial interface 120 based on the voltage level at the terminal 124.

For instance, as mentioned above, this voltage level of said terminal 124 may be used as an indicator in order to decide whether a device connected to the second serial interface 120 represents a device which is configured to supply power via the power terminal 121 or represents a device which is configured to receive power via the power terminal 121. For instance, a predetermined voltage threshold, which may depend on the type of the second serial interface 120, can be used for carrying out this decision.

For instance, when the detected voltage level is above the predetermined voltage threshold then the switching unit 120 may connect the power terminals 111 and 121, as indicated by step 220 in FIG. 2, and when the detected voltage level is below or equal to the predetermined voltage threshold then the switching unit 120 may connect the power terminals 111 and 121, as indicated by step 230 in FIG. 2. Or, vice versa, it may be decided at step 210 to proceed with disconnecting the power terminals 111 and 121 (step 230 in FIG. 2) in case the detected voltage level is above the predetermined voltage threshold or it may be decided at step 210 to proceed with connecting the power terminals 111 and 121 (step 220 in FIG. 2) in case the detected voltage level is not above the predetermined voltage threshold. This predetermined voltage level may vary and depend on the type the second serial interface 120 and the relevant peripheral devices which are configured to be connected to said second serial interface 120

Thus, in case the voltage level at terminal 124 indicates a device which is configured to supply power via the power terminal 121 then the switching unit 130 disconnects the power terminal 111 of the first serial interface from the power terminal 121 of the second serial interface 120.

Otherwise, incase the voltage level at terminal 121 indicates a device which is configured to receive power via the power terminal 121 then the switching unit 130 connects the power terminal 111 of the first serial interface from the power terminal 111 of the first serial interface to the power terminal 121 of the second serial interface 120, as exemplarily indicated by step 230 in FIG. 2. Accordingly, when the apparatus 100 is connected to another device via the first serial interface 110, then the device connected to the second serial interface 120 can be provided with power via the connected power terminals 110 and 120 of the first serial interface 110 and the second serial interface 120.

Further, the apparatus 100 may comprise a detection unit and/or a control unit (not depicted in FIG. 1a) configured to detect the voltage level at terminal 124 and/or configured to switch the switching unit 130. This detection unit and/or control unit may be integrated in the switching unit 130.

Figure 1B:
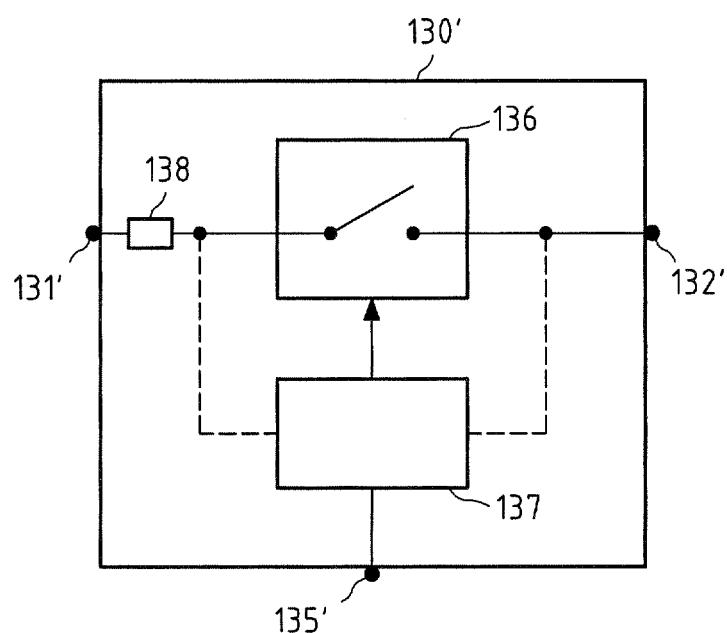
FIG. 1b: an illustration of a first exemplary switching unit configured to be used for the present invention.

FIG. 1b depicts an illustration of a first exemplary switching unit 130' configured to be used for the present invention, i.e. this switching unit 130' may be used as switching unit 130 depicted in FIG. 1a and for any of the switching units in the subsequent exemplary embodiment of the present invention. This switching unit 130' may comprise a switching element 136 configured to connect or disconnect connectors 131' and 132', and a control unit 137 configured to control the switching element 136 based on a voltage level at connector 135'. Thus, the detection unit and/or control unit mentioned above may be integrated in this control unit 137. Furthermore, the switching element 136 and the control unit 137 may represent a combined unit (not depicted in FIG. 1b), and, further, as indicated by the dashed lines in FIG. 1, the control unit 137 may further be connected to at least one of the connectors 131' and 132'. This optional connection to at least one of the connections 131' and 132' may for instance be used to supply the control unit 137 with power supplied from one or both of the power terminals 111 and 121 of the first and second serial interfaces 110, 120.

After it has been decided to perform connecting or disconnecting the power terminals 111 and 121, the method may for instance jump back to step 210 in order to monitor whether there is a change of the voltage level at the terminal 124.

Furthermore, the apparatus 100 may comprise any kind of well-suited connections between terminals 112,113,115 of the first serial interface 110 and terminals 122 of the second serial interface 120 and other terminals (not depicted in FIG. 1a) of the second serial interface 120, as exemplarily indicated by the dashed lines in FIG. 1a.

Thus, the apparatus 100 allows the connection of any peripheral device to another device having for example a USB standard-A interface without danger of power supply violation between the peripheral device and the other device. Hence, the apparatus 100 may represent an adaptor.

Furthermore, an optional fuse 138 or similar protecting device may be used for protection of the switching element 136.

Figure 3:
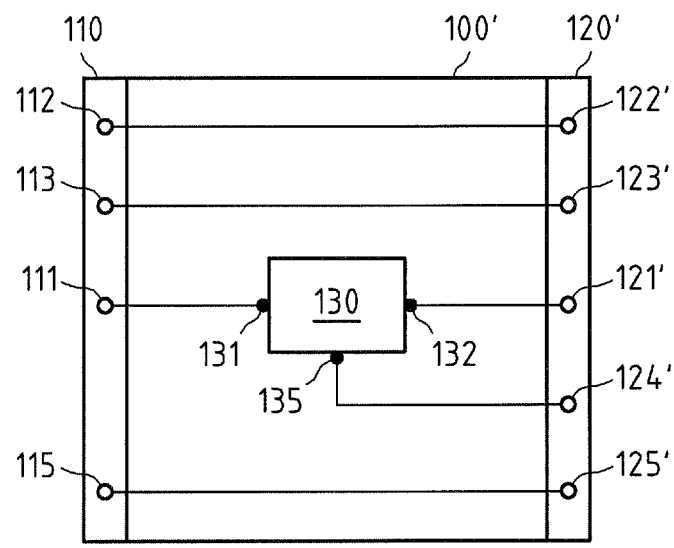
FIG. 3: an illustration of a second exemplary embodiment of an apparatus according to the present invention.

FIG. 3 depicts a second exemplary embodiment of an apparatus 100' according to the present invention which is substantially based on the first exemplary embodiment depicted in FIG. 1a.

The first serial interface 110 of apparatus 100' corresponds for example to the USB standard-A interface 110 of the apparatus 100. The second serial interface 120' represents a second USB interface 120', wherein this second USB interface 120' may represent a USB micro interface. For instance, said second USB interface 120' may represent a USB Micro-AB receptacle. This second USB interface 120' comprises a D+ terminal 122' and a D− terminal 123' which may be connected to the D+ terminal 112 and the D− terminal 113 of the USB standard-A interface 110, respectively. The terminals 115 and 125' represent GND terminals.

Similar to the first exemplary embodiment, the switching unit 130 of apparatus 100' is connected via contact 131 to the power terminal 111 of the USB standard-A interface 110 and it is connected via contact 132 to the power terminal 121' of the second USB interface 120.

Furthermore, the switching unit 130 is connected to the ID terminal 124' of the second USB interface 120'. Accordingly, the switching unit 130 connects or disconnects the power terminals 111 and 121' of the interfaces 110 and 120' based on the voltage level of the ID terminal 124'.

In this case, the apparatus 100' may be configured to disconnect the power terminals 111 and 121' in case the voltage level at ID terminal 124' is higher than GND (i.e. above a very low voltage level) and it may be configured to connect the power terminals 111 and 121 in case the voltage level at ID terminal is substantially zero.

Thus, when a USB OTG apparatus having a USB Micro-A plug is connected to this second USB interface 120', i.e. the USB OTG apparatus represents a OTG device (i.e. no host role or charger), then the ID terminal of the USB OTG device is short-circuited or has low impedance to the GND terminal. In this case, the apparatus 100' detects the very low or zero voltage level at ID terminal 124' (step 210 in FIG. 2) and connects the power terminal 111 of the USB standard-A interface 110 to the power terminal 121' of the second USB interface 120' (step 220 in FIG. 2). Thus, the USB OTG device connected to the second USB interface 120' can be provided with power from the first power terminal 111 by means of the connection between the power terminals 111 and 121'. Accordingly, an OTG device connected to the second USB interface 120' can be detected by means of the voltage at the ID terminal 120'.

Furthermore, in case a USB host or charger is plugged to this second USB interface 120' by means of a USB Micro-B plug, then the ID terminal of the OTG host or charger is not connected to GND and is floating or has high impedance. Accordingly, the apparatus 100' detects a voltage level higher than GND at ID terminal 124' and disconnects the power terminal 111 of the first USB device and the power terminal 121' of the second USB device.

Figure 4A:
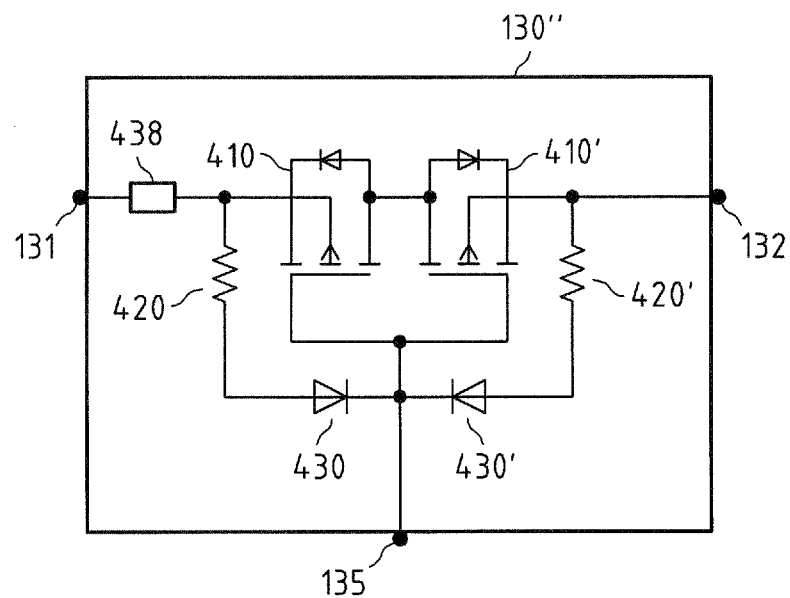
FIG. 4a: an illustration of a second exemplary switching unit configured to be used for the present invention.

FIG. 4a depicts an illustration of a second exemplary switching unit 130" configured to be used for the present invention. This switching unit 130" comprises at least one transistor 410, 410' for carrying out the connection and disconnection between connectors 131 and 132.

For instance, as indicated in FIG. 4, this switching unit 130" may comprise a first FET transistor 410 and a second FET transistor 410', but any other transistor circuit may be used for the switching unit 130".

The diodes 430 and 430' may be used to guarantee that the FET transistor 410 and 410' do not leak with real components.

For reasons of illustration and without any restrictions, it may be assumed that the switching unit 130" is used as switching unit for the apparatus 100' depicted in FIG. 3. Thus, in case the ID terminal 124 is short-circuited with GND by means of a device connected to the second serial interface 120', the connector 135 has also GND potential so that transistors 410 and 410' are turned on when power is supplied from the power terminal 111 of the first serial interface 110 to connector 131. This, in this case the switching unit 130" connects the power terminals 111 and 121'. The diodes 430 and 430' may achieve to pull up both the transistors 410 and 410' reliable even when one of the transistors 410, 410' tries to pull down.

Otherwise, in case the ID terminal 124' is floating, then no current flows through any of the resistors 420 and 420', the transistors 410 and 410' gates are pulled up and the switching unit 130" disconnects the connectors 131 and 132 and thus disconnects the power terminals 111 and 121'.

Furthermore, an optional fuse 438 or similar protecting device may be used for transistor overcurrent protection.

Figure 4B:
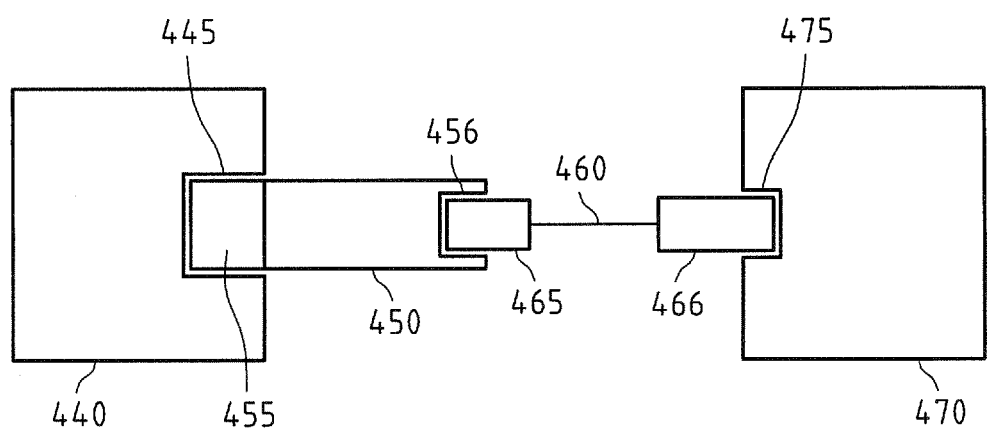
FIG. 4b: an illustration of a first exemplary system according to the present invention.

FIG. 4b depicts a first exemplary system according to the present invention. This system comprises an apparatus 450 according the present invention, wherein this apparatus 450 may for instance represent anyone of the apparatuses 100 and 100 depicted in FIGS. 1a and 3, respectively.

The first serial interface 455 may represent a USB standard-A plug and the second interface 456 may represent a USB Micro-AB receptacle.

The USB standard A plug 455 can be plugged to a USB standard a receptacle of a further apparatus 440, as exemplarily indicated in FIG. 4b, wherein this further apparatus 440 may for instance represent a PC, a USB host or a USB charger.

Furthermore, for instance, a well-suited USB cable 460 may be used to plug any kind of USB apparatus 470 having a Micro USB interface 475 to the second interface 456 of apparatus 450. For instance, said USB apparatus 470 may represent a USB OTG device which may comprise a USB Micro-AB receptacle 475. For this case, the USB cable 460 may comprise a USB Micro-B plug 466 for plugging to the Micro-AB socket 475, and the USB cable 460 may comprise a Micro-A plug 465 for plugging into the Micro-AB receptacle 456 of apparatus 450.

Figure 5A:
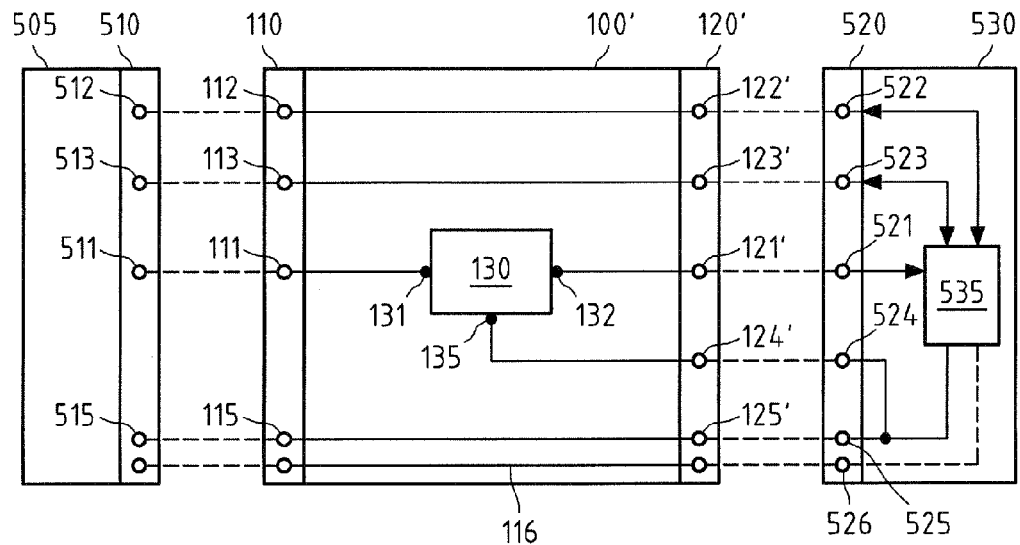
FIG. 5a: an illustration of a second exemplary system according to the present invention.

FIG. 5a depicts a second exemplary system according the present invention. This system comprises an apparatus 100' according the present invention, wherein this apparatus 100' may represent the apparatus 100' depicted in FIG. 3.

The apparatus 100' comprises a USB standard-A interface 110 which may represent a USB standard-A plug 110 and the apparatus 100' comprises a second USB interface 120' which may represent a USB micro interface. For instance, this second USB interface 120' may represent a USB Micro-AB receptacle so that USB Micro-A plugs as well as USB Micro-B plugs can be plugged to the second USB interface 120'. The apparatus 100' may further comprise a shield 116 which may have separate terminals.

The system further comprises a device 505, e.g. a PC, a USB hub, a USB charger or any other suited device, wherein said device 505 comprises a USB standard-A receptacle 510. This USB standard-A receptacle 510 comprises a D+ terminal 512, a D− terminal 513, a Vbus terminal 511 in order to supply power and a ground terminal 515. According to the Universal Serial Bus Specification (Revison 2.0, Apr. 27, 2000) the voltage at the Vbus terminal 511 may be in the range from 4.40 to 5.25V and the Vbus terminal 511 may provide a current up to 5 A. Of course, any other voltages and currents may be supplied by the Vbus terminal 511.

This device 505 may be connected to USB standard-A interface 110 of apparatus 100' by means of the USB standard-A receptacle 510, as indicated by the dashed line in FIG. 5a.

The second exemplary system further comprises a USB device 530, wherein this USB device 530 comprises a USB device unit 535 and USB Micro-A plug 520. The D+ terminal 522 and the D− terminal 523 of the USB Micro-A plug 520 are connected to the USB device unit 535 in order to perform any kind of communication, and the Vbus power terminal 521 is connected to the USB device 535 in order to provide the USB device unit 535 with power. Furthermore, the ID terminal 524 is short-circuited to the GND terminal 525 in order to indicate a USB device (and no host or charger). Further, the USB device 530 may comprise a shield terminal 526 which may be connected to the USB device unit 535.

The USB device 530 may be connected to the second USB interface 120' of apparatus 100'. Thus, the apparatus 100' may acts as an adaptor in order to connect the USB device 530 to the USB standard-A receptacle 510 of device 505.

As mentioned above, the apparatus 100' detects the voltage level at the ID terminal 124' of its second USB interface 120' and decides whether to connect or to disconnect the power terminal 111 of the first USB interface 110 and the power terminal 121' of the second USB interface 120'.

In this second exemplary system depicted in FIG. 5a, due to the connected USB Micro-A plug 520 and the short-circuited or low impedance ID terminal 524, the apparatus 100' detects a very low or zero voltage at power terminal 124' and thus the switching unit 130 connects the power terminal 111 of the first serial USB interface 110 to the power terminal 121' of the second serial USB interface 120'. Accordingly, the Vbus terminal 511 of the device 505 is connected through switching unit 130 to Vbus terminal 521 of the USB device 530 so that the USB device unit 535 can be supplied with power from the device 505.

Thus, in this second exemplary system the apparatus 110' identifies that a USB device (and no host or charger) is connected to the second USB interface 120' by means of the voltage level at the power terminal 124'.

Figure 5B:
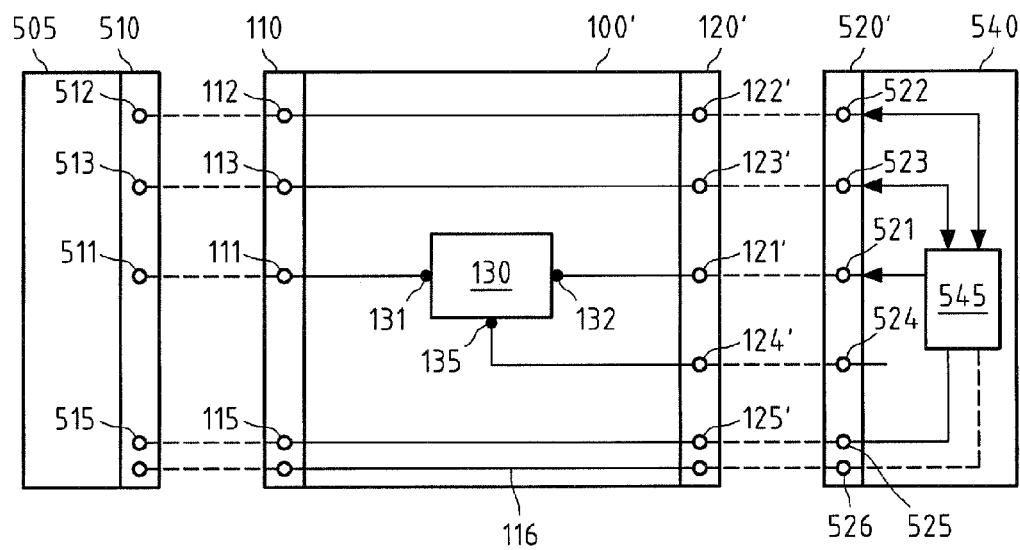
FIG. 5b: an illustration of a third exemplary system according to the present invention.

FIG. 5b depicts a third exemplary system according to the present invention. This third system exemplary system corresponds to the second exemplary system depicted in FIG. 5a except for the apparatus 540 which is plugged to the second USB interface 120' of apparatus 100'.

The apparatus 540 may represent a OTG host comprising a OTG host unit 545 and a USB Micro-B plug 520'. The OTG host unit 545 is configured to provide power to the Vbus terminal 521. According to the USB OTG rules, the ID terminal 524 of said OTG host 540 is floating or has high impedance.

As mentioned above, the apparatus 100' detects the voltage level at the ID terminal 124' of the second USB interface 120' and decides whether to connect or to disconnect the power terminal 111 of the first USB interface 110 and the power terminal 121' of the second USB interface 120'. Due to the floating ID terminal 124' the switching unit 130 disconnects the power terminal 111 of the first USB interface 110 from the power terminal 121' of the second USB interface 120 so that no power violation between power supplied from the Vbus terminal 511 of device 505 and power supplied from the Vbus terminal 512 of the USB host device 540 occurs.

Figure 5C:
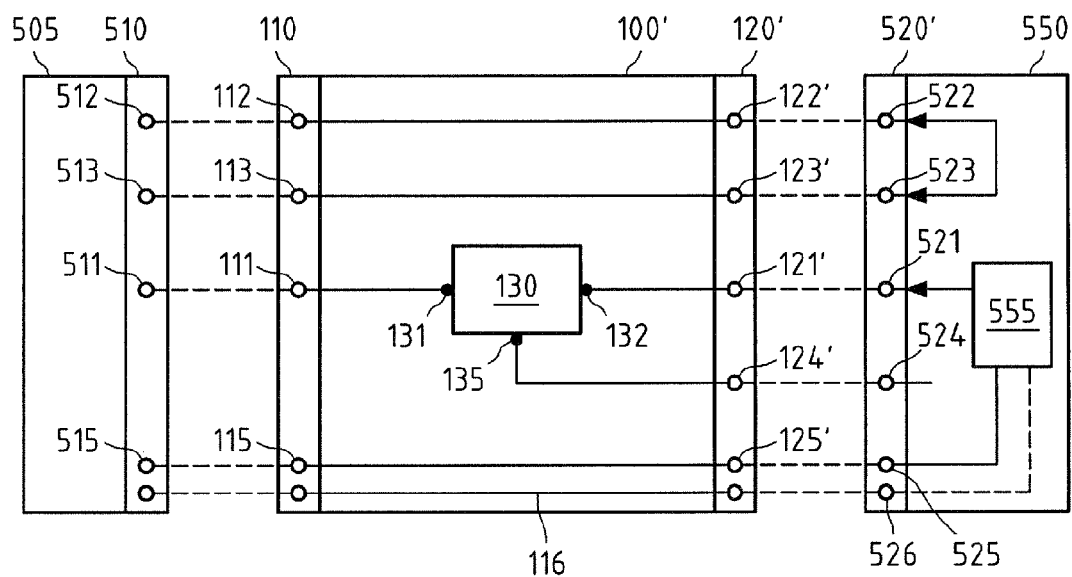
FIG. 5c: an illustration of a fourth exemplary system according to the present invention.

FIG. 5c depicts a fourth exemplary system according to the present invention. This third system exemplary system corresponds to the first exemplary system depicted in FIG. 5a except for the apparatus 550 which is plugged to the second USB interface 120' of apparatus 100'.

The apparatus 550 may represent a USB charger comprising a USB charger unit 555 and a USB Micro-B plug 520', wherein this USB Micro-B plug 520' corresponds to that of the third exemplary system depicted in FIG. 5b. The USB charger unit 555 is configured to provide power to the Vbus terminal 521, and the D+ terminal 522 and D– terminal 523 may be connected to each other in order to indicate the USB charger. According to the USB OTG rules, the ID terminal 524 of said USB charger 550 is floating or has high impedance.

As mentioned above, the apparatus 100' detects the voltage level at the ID terminal 124' of the second USB interface 120' and decides whether to connect or to disconnect the power terminal 111 of the first USB interface 110 and the power terminal 121' of the second USB interface 120'. Due to the floating ID terminal 124' the switching unit 130 disconnects the power terminal 111 of the first USB interface 110 from the power terminal 121' of the second USB interface 120 so that no power violation between power supplied from the Vbus terminal 511 of device 505 and power supplied from the Vbus terminal 512 of the USB charger 550 occurs.

Thus, even in case a USB charger 550 with a Micro-B plug 520' is plugged to a USB standard-A receptacle 510 of the device 505 via the apparatus 100', no power violation between the USB charger 550 and the device 505 occurs.

Figure 5D:
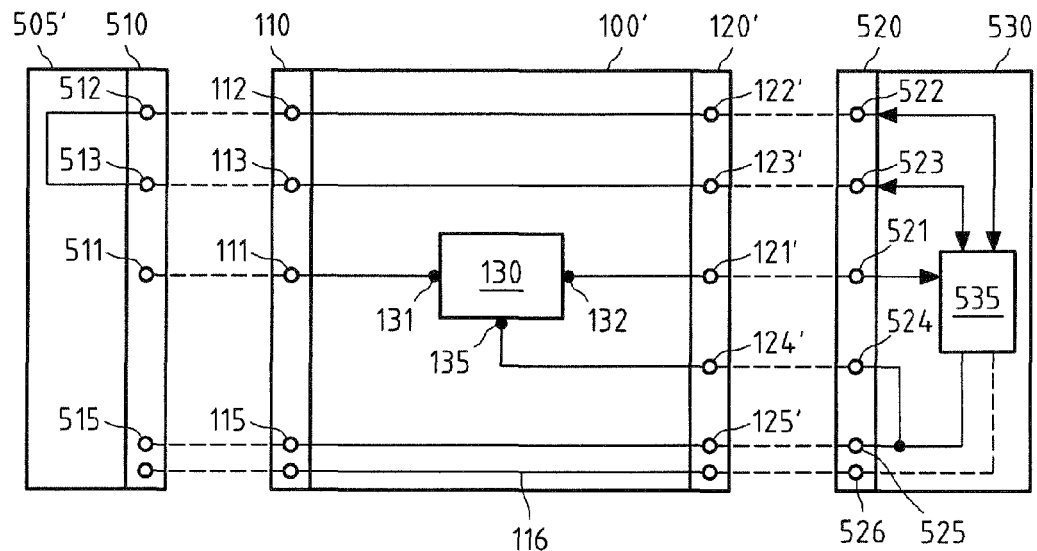
FIG. 5d: an illustration of a fifth exemplary system according to the present invention.
Figure 5E:
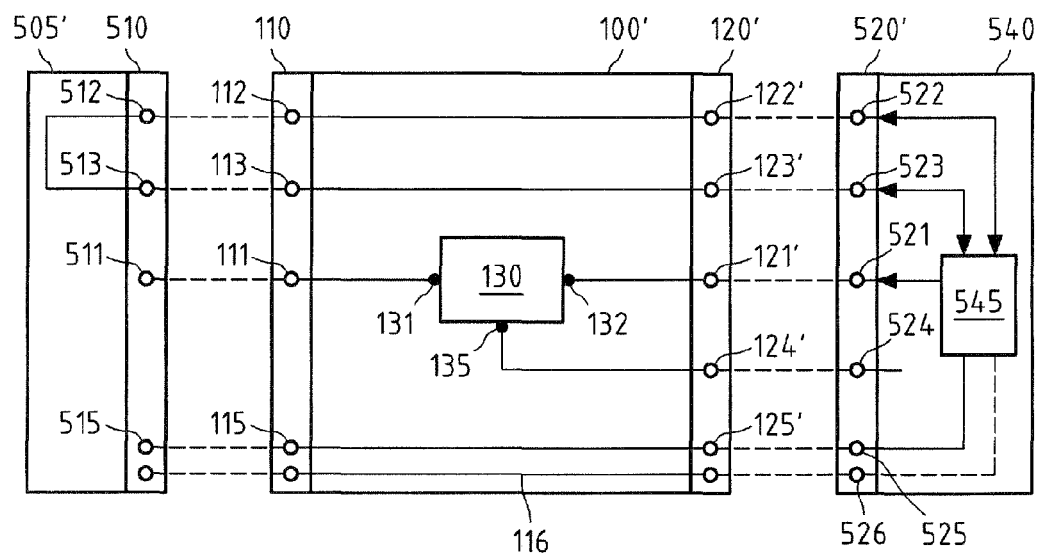
FIG. 5e: an illustration of a sixth exemplary system according to the present invention.
Figure 5F:
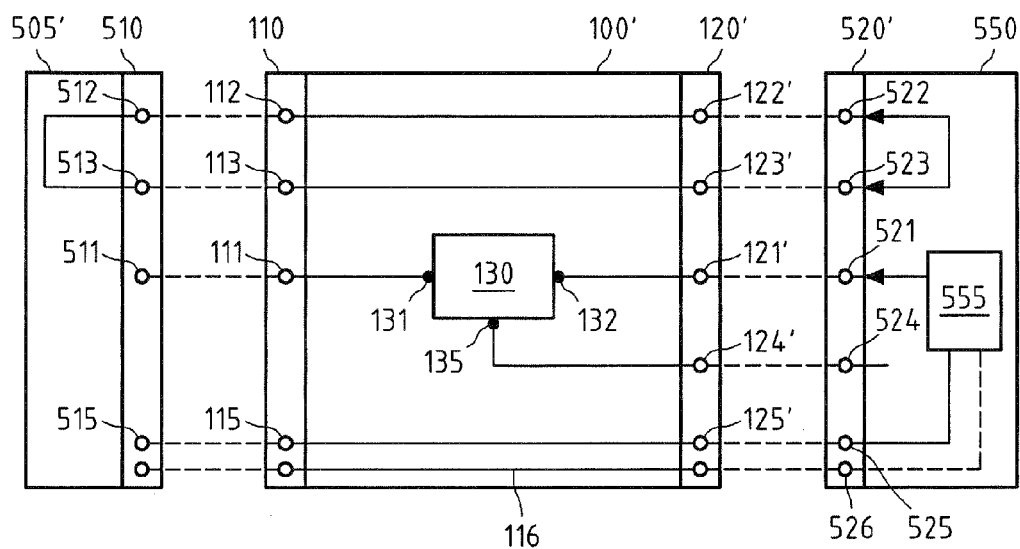
FIG. 5f: an illustration of a seventh exemplary system according to the present invention.

FIGS. 5d, 5e and 5f depicts a fifth, sixth and seventh exemplary system according to the present invention, respectively. The fifth, sixth and seventh exemplary systems are substantially based on the second, third and fourth exemplary systems, respectively, wherein the device 505 is replaced with a dedicated USB charger device 505'.

For instance, this USB charger device 505' may provide a voltage up to 8V at Vbus terminal 511 and a maximum current of 1.8 A. Thus, the switching unit 130 must be configured to tolerate a current up to 1.8 A. For instance, the switching unit 130' may be used as switching unit in any of the systems depicted in FIGS. 5a-5f.

It is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. Said computer software may be stored in a variety of storage media of electric, magnetic, electro-magnetic or optic type and may be read and executed by a processor, such as for instance a microprocessor. To this end, said processor and said storage medium may be coupled to interchange information, or the storage medium may be included in the processor.

The invention has been described above by means of exemplary embodiments. It should be noted that there are alternative ways and variations which are obvious to a skilled person in the art and can be implemented without deviating from the scope and spirit of the appended claims. In particular, the present invention is not limited to application in USB OTG micro interface but may be applied to any other kind of interconnection between serial interfaces.

What is claimed is:

1. An apparatus, comprising:
at least one processor; and
a non-transitory storage medium including computer program code, where the storage medium and the computer program code are configured, with the at least one processor, to cause the apparatus to at least:
identify based at least on a voltage level at an identification terminal of a second serial interface whether a device connected with the second serial interface to a first serial interface connected to the apparatus is configured to supply power via the second serial interface to the first serial interface; and
based on identifying that the voltage level at the identification terminal of the second serial interface is above the predetermined voltage threshold, disconnect a power terminal of the first serial interface to a power terminal of the second serial interface, and
based on identifying that the voltage level at the identification terminal of the second serial interface is below or equal to the predetermined voltage threshold, connect the power terminal of the first serial interface to the power terminal of the second serial interface,
wherein the first serial interface comprises at least one data line and at least one power supply line, and wherein the power terminal of the first serial interface is connected to or disconnected from the power terminal of the second serial interface based on the voltage level at the identification terminal of the second serial interface being one of above and not above a predetermined voltage threshold.

2. The apparatus according to claim 1, wherein the first serial interface comprises a universal serial bus interface.

3. The apparatus according to claim 1, wherein the first serial interface comprises a universal serial bus standard-A plug.

4. The apparatus according to claim 1, wherein the second serial interface comprises a universal serial bus interface.

5. The apparatus according to claim 1, wherein the second serial interface comprises a universal serial bus Micro-AB receptacle.

6. A method, comprising
identifying, by an apparatus, based at least on a voltage level at an identification terminal of a second serial interface whether a device connected with the second serial interface to a first serial interface connected to the apparatus is configured to supply power via the second serial interface to the first serial interface; and
based on identifying that the voltage level at the identification terminal of the second serial interface is above the predetermined voltage threshold, disconnecting, by the apparatus, a power terminal of the first serial interface to a power terminal of the second serial interface, and
based on identifying that the voltage level at the identification terminal of the second serial interface is below or equal to the predetermined voltage threshold, connect the power terminal of the first serial interface to the power terminal of the second serial interface,
wherein the first serial interface comprises at least one data line and at least one power supply line, wherein the power terminal of the first serial interface is connected to or disconnected from the power terminal of the second serial interface based on the voltage level at the identification terminal of the second serial interface being one of above and not above a predetermined voltage threshold.

7. The method according to claim 6, wherein the first serial interface comprises a universal serial bus interface.

8. The method according to claim 7, wherein the first serial interface comprises a universal serial bus standard-A plug.

9. The method according to claim 6, wherein the second serial interface comprises a universal serial bus interface.

10. The method according to claim 9, wherein the second serial interface comprises universal serial bus Micro-AB receptacle.

11. The method according to claim 6, wherein the power terminal of the first serial interface is connected to the power terminal of the second serial interface when the voltage level at the identification terminal of the second serial interface is below or equal to the predetermined voltage threshold, and wherein the power terminal of the first serial interface is disconnected from the power terminal of the second serial interface when the voltage level is above the predetermined voltage threshold.

12. The method according to claim 6, wherein the predetermined voltage threshold represents a zero voltage level.

13. The method according to claim 6, wherein the disconnecting and connecting is performed by a switching unit which comprises at least one transistor connecting or disconnecting the power terminal of the first serial interface to the power terminal of the second serial interface.

14. The method according to claim 13, wherein the switching unit further comprises an overcurrent protection element protecting at least one transistor of the at least one transistor.

15. The method according to claim 6 performed by computer program code embodied in a non-transitory storage medium and executed by at least one processor.

* * * * *